(12) United States Patent
Charmat

(10) Patent No.: US 7,703,581 B1
(45) Date of Patent: Apr. 27, 2010

(54) DISC BRAKE

(75) Inventor: Djamel Charmat, Sount Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 794 days.

(21) Appl. No.: 11/460,373

(22) Filed: Jul. 27, 2006

(51) Int. Cl.
*F16D 55/14* (2006.01)

(52) U.S. Cl. .................... 188/72.2; 188/70 B; 188/72.6

(58) Field of Classification Search ............... 188/70 B, 188/72.2, 72.4, 72.6, 72.9
See application file for complete search history.

(56) References Cited

U.S. PATENT DOCUMENTS

| | | | | |
|---|---|---|---|---|
| 3,422,934 | A | * | 1/1969 | Hambling .................. 188/72.2 |
| 3,703,944 | A | * | 11/1972 | Hendrickson .............. 188/72.2 |
| 4,200,173 | A | | 4/1980 | Evans et al. |
| 4,375,250 | A | * | 3/1983 | Burgdorf .................. 188/72.2 |
| 6,039,156 | A | * | 3/2000 | Schneider ................ 188/73.44 |
| 6,454,056 | B1 | | 9/2002 | Iida |
| 6,478,122 | B1 | | 11/2002 | Demoise et al. |

* cited by examiner

*Primary Examiner*—Bradley T King
(74) *Attorney, Agent, or Firm*—Maginot, Moore & Beck

(57) ABSTRACT

A disc brake wherein first and second friction member are aligned by first and second rails with a rotor. A piston retained in a caliper has a first radial groove separated from a second groove in a carrier for the first friction member by an oval member. The piston responds to pressurized fluid to create a braking force that acts the piston to move the first friction member into engagement with the rotor. On engagement with the rotor the first friction member rotates to bring the carrier into abutment engagement with the rail and at the same time the oval member pivots within the second groove to push the housing such that a running clearance is eliminated with the rotor such that the pressurized fluid may thereafter act on the housing to define a clamping force between the first and second friction members and rotor to effect a brake application.

9 Claims, 4 Drawing Sheets

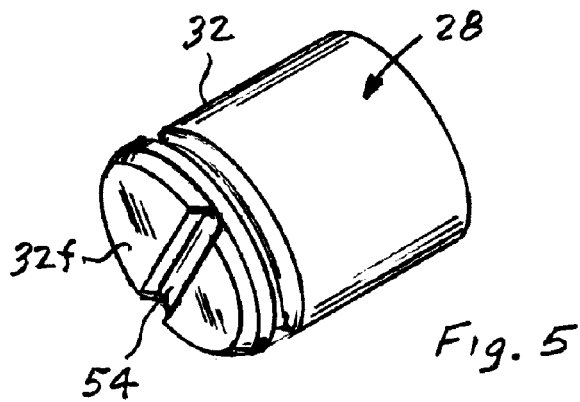
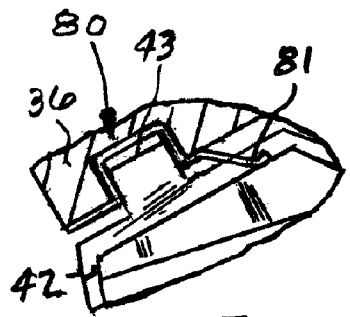
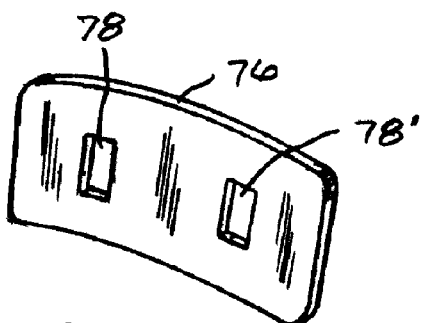
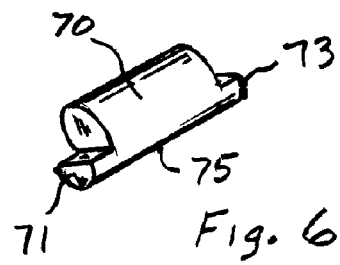
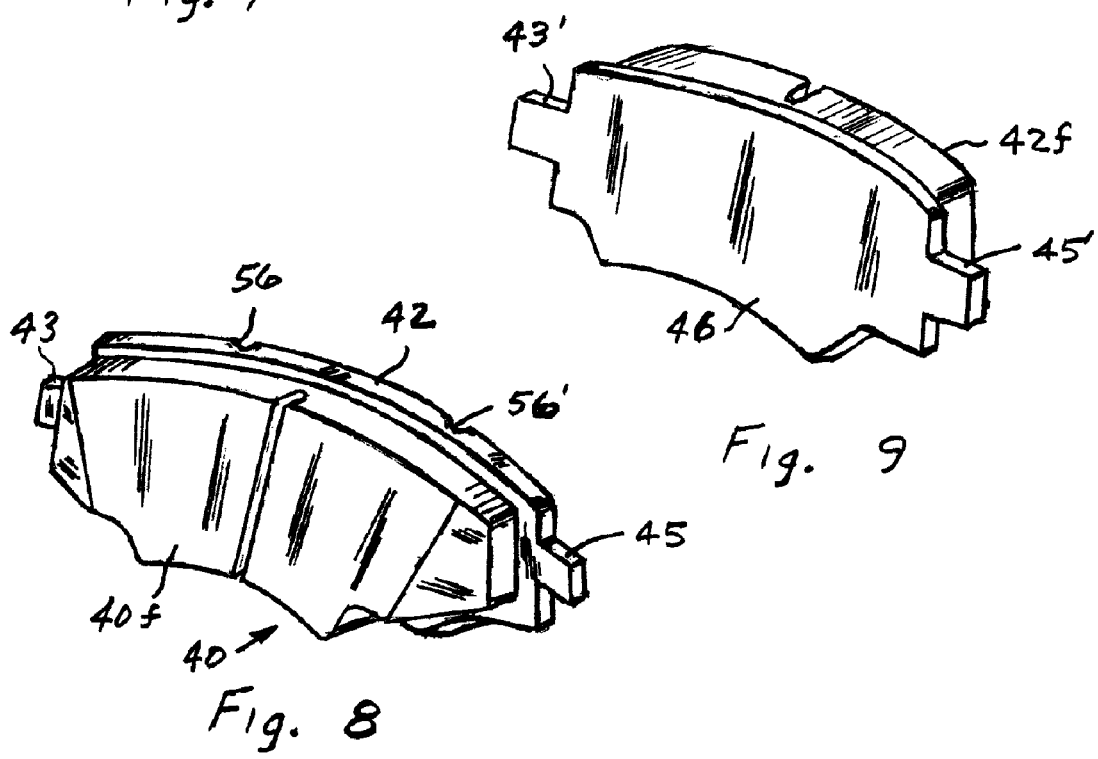

DISC BRAKE

This invention relates to a disc brake having a toggle located between an actuation arrangement and a first friction member whereby engagement of the first friction member in closing a running clearance with a rotor causes the first friction member to rotate and corresponding pivots the toggle to close a running clearance between the second friction member and rotor such that pressurized fluid through which a brake application is initiated may thereafter be simultaneously applied to create a clamping force in effecting a brake application.

BACKGROUND OF THE INVENTION

Disc brakes commonly have spaced apart rails that extend from a support member that is fixed to a frame of a vehicle to align and position first and second friction pads with respect to a rotor, the structure in the following U.S. Pat. Nos. 4,200,173 and 6,454,056 may be considered as representative of the prior art. In this type disc brake, first and second guide pins that are fixed to a caliper extend through ears on the support member and are retained in corresponding first and second bores that are parallel with the first and second rails. A piston arrangement is located in a bore of the caliper and is connected to the first friction pad. When pressurized fluid is presented to the bore it acts on the piston to create an actuation force that moves the piston toward the caliper. When the first friction pad engages the rotor a reaction force is created that opposes the actuation force such that a volume of the pressurized fluid in an actuation chamber is initially reduced as the housing slides on the guide pins to move the second friction pad into engagement with the rotor and thereafter develop a clamping force to effect a brake application. The flux in the volume of fluid on initiation of a brake application prior to the development of the clamping force is a function of a running clearance between the first and second friction pads and the rotor. It is desirable that the running clearance be as small as possible and yet large enough that intermittent contact does not occur as every time the friction pads engages the rotor wear since an uneven wear pattern may be created. With an even wear pattern some sort of vibration is sensed by the driver of the vehicle during a brake application. One solution to prevent uneven wear is to make the running clearance so large that the pads will never contact the rotor. To achieve a large running clearance, a piston would have to be retracted this same large distance after each brake application and would have to be moved this same distance during a brake application which would result in a corresponding large fluid displacement and pedal travel to effect a brake application. As could be expected, large such pedal travel is a functional characteristic that is normally unacceptable by a customer.

SUMMARY OF THE INVENTION

A primary advantage of the disc brake of the present invention resides in structure wherein the running clearance of first and second friction members and a rotor is mechanically closed and as a result a displacement of a volume of pressurized fluid used to effect a brake application is not effected and is directed in developing a clamping force between the first and second friction members with respect to the rotor.

In more particular detail, the disc brake has a support member that is fixed to a stationary member with first and second spaced apart rails. The rails receive and align a first friction member on a first side of a rotor and align a second friction member on a second side of the rotor while guide pins fixed to ears of the housing for a caliper are received in parallel bores within the support member. The housing of the caliper has an actuation chamber that retains a piston arrangement and selectively receives pressurized fluid from a source that acts on the piston arrangement to create a braking force that respectively moves the first and second friction members into engagement with the first and second sides of the rotor to effect a brake application. The piston arrangement is characterized by a cylindrical body that has a face with a first radial groove therein while the first friction member includes a carrier with a second radial groove therein that is located between a first end and a second end. A linkage arrangement defined by an oval member has a first end retained the first radial groove and a second end retained in said second radial groove such that the braking force from the cylindrical body is communicated through the oval member to the carrier to move the first friction member into engagement with the first side of the rotor. On engagement of the first friction member with the rotor, the first end of the carrier member is rotated into abutment engagement with the first rail to oppose the rotation of the rotor. As the carrier is moved toward the first rail, the oval member pivots in the second radial groove and applies an actuation force on the housing by way of the cylindrical body to mechanically move the second friction member into engagement with the second side of the rotor and move the carrier for the second friction member into engagement with the first rail to take up any running clearance between the first and second friction member and the rotor such that pressurized fluid supplied to the actuation chamber may immediately act on the housing of the caliper and hydraulic urge the second friction member toward the second side of the rotor in establishing a clamping force to effect a brake application.

An advantage of the disc brake of this invention resides in a relationship defined by a toggle mechanism that is located between an actuation piston and a carrier for a first friction member whereby a running clearance is mechanically closed between first and second friction members and a rotor such that a braking force derived from pressurized hydraulic fluid is essentially utilized to create a clamping force that is applied by the first and second friction members to a rotor to effect a brake application.

A further advantage of this disc brake resides in this disc brake whereby a running clearance between first and second friction members and a rotor may be selectively set as a function the shape of an oval toggle and mechanically closed prior to the development of a hydraulic clamping force created to effect a brake application.

An object of the present invention is to provide a disc brake with structure whereby a running clearance between first friction member and a rotor is initially closed and a running clearance between a second friction member and the rotor is sub sequentially mechanically closed as a function of the rotative movement of the first friction member into engagement with an anchor such that pressurized hydraulic fluid may thereafter be applied to create a clamping force on the rotor by the first and second friction members.

BRIEF DESCRIPTION OF THE DRAWINGS

FIG. 5 is a perspective view of a piston of the disc brake of FIG. 1;

FIG. 6 is a perspective view of a toggle member of the disc brake of FIG. 1;

FIG. 7 is a perspective view of a retention plate that is attached to a carrier member of a first friction member for the disc brake of FIG. 1;

FIG. 8 is a front perspective view of the first friction member of the disc brake of FIG. 1;

FIG. 9 is a rear perspective view of a second friction member of the disc brake of FIG. 1;

FIG. 10 is a sectional view of a slipper member for use in the disc brake of FIG. 1.

DETAILED DESCRIPTION

Figure 1:
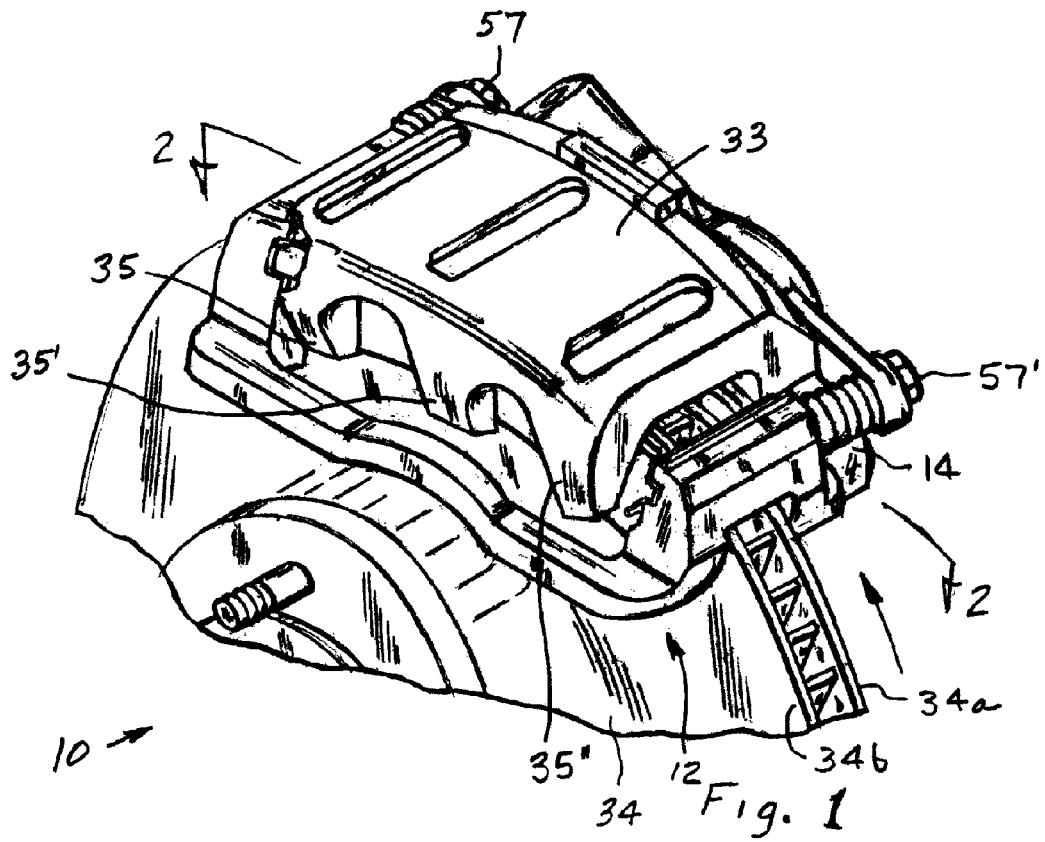
FIG. 1 is a front perspective view of a disc brake according to the present invention.

Throughout this specification when a same component is used in more than one location the component may be identified by a same number with ' added to the number.

The disc brake 10 of the present invention is illustrated in FIGS. 1, 2, 3 and 4 and distinguished from prior art disc brake such as disclosed in U.S. Pat. No. 4,200,173 by a toggle means 50 that links piston members 28,28' with a backing plate or carrier 42 for a first friction member 40 such that after a first running clearance between the first friction member 40 and a rotor 34 a second friction running clearance between a second friction member 44 and rotor is closed by the rotation of the first friction member 40 toward a rail 36 of an anchor 12 such that pressurized hydraulic fluid presented to an actuation chamber 18,18' may thereafter simultaneously acts on the piston members 28,28' and housing 29 for the caliper 16 to move the first 40 and second 44 friction members toward the rotor 34 and develop a desired clamping force to effect a brake application.

In more particular detail, the disc brake 10 includes the anchor 12 that is defined by a base 35 that is fixed to a housing 14 of a vehicle by bolts (not shown) that extend through bosses 15, 15', first 36 and second 38 rails that are spaced apart and extend from the base 35 along perpendicular planes thereto and first 51 and second 52 bores that are parallel to the first 36 and second 38 rails.

The caliper 16 for the disc brake 10 is defined by housing 29 that includes an actuation section 31 with bores 30, 30' therein for respectively retaining pistons members 28 and 28', a bridge 33 that spans rotor 34 and arms 35, 35', 35" that radially extend inward from the bridge 33. The housing 29 has a first ear 49 and a second ear 49' that extend there from with axial openings therein for respectively receiving a first pin 53 and a second pin 53'. Pin 53 is secured to ear 49 and extends through opening therein is located in bore 51 of the anchor 12 while pin 53' is secured to ear 49' and is located in bore 52 of the anchor 12 such that pistons members 28, 28' and arms 35, 35'. 35" are perpendicular to rotor 34 and caliper 16 is supported on anchor 12.

The backing plate or carrier 42 for the first friction member 40 and backing plate or carrier 46 for the second friction member 44 are aligned on the first 36 and second 38 rails to position the respective faces thereon with the rotor 34. Specifically, carriers 42 has a first ear 43 and a second ear 45, see FIG. 8 while carrier 46 has a first ear 43' and a second ear 45', see FIG. 9. The first ears 43 and 43' are retained by the first rail 36 while the second ears 45 and 45' are retained by the second rail 38 such that face 40f on the first friction member 40 and face 42f on the second friction member 44 are respectively aligned along a plane that is parallel with face 34a and 34b on rotor 34.

Figure 4:
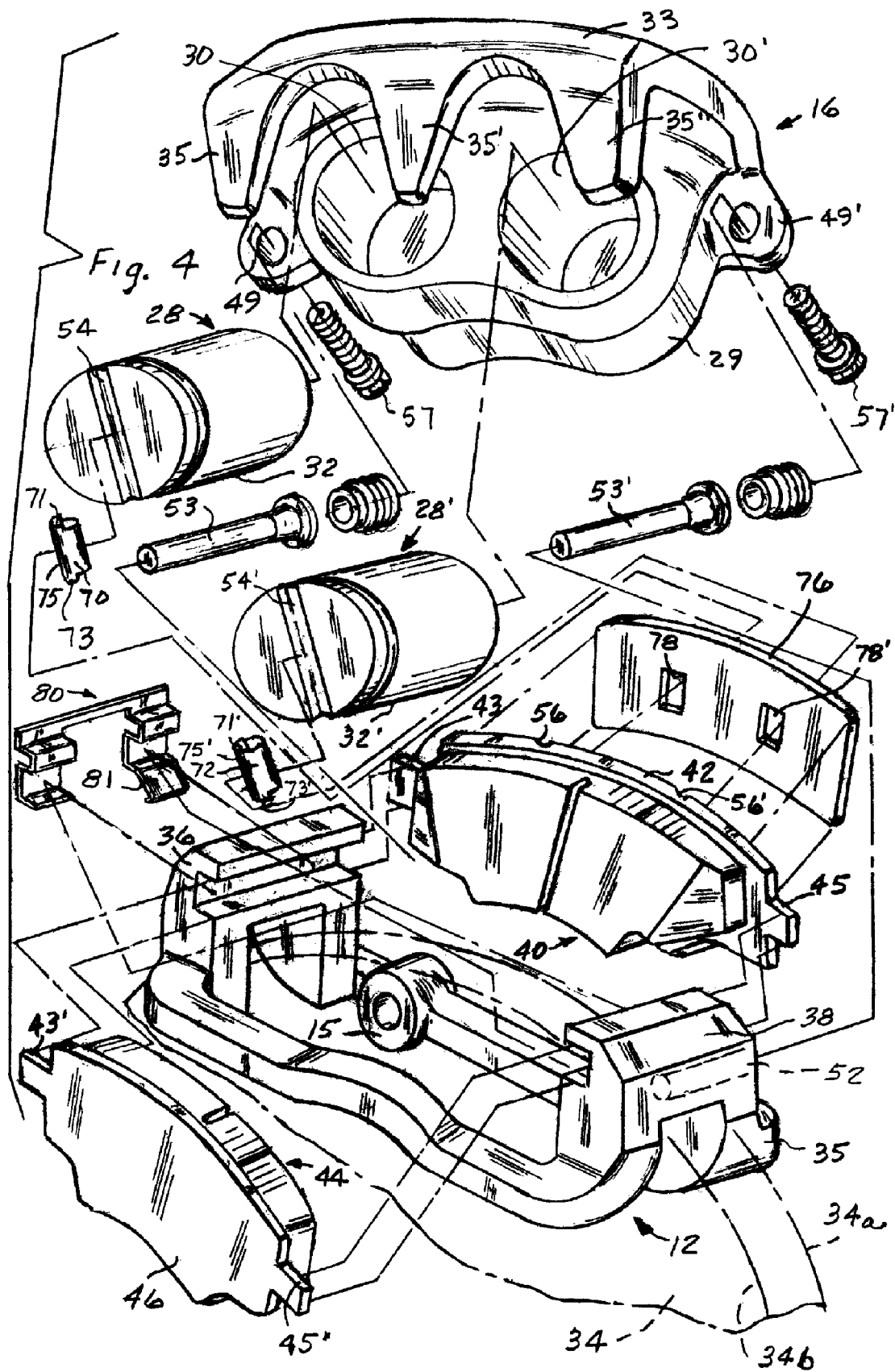
FIG. 4 is an assembly view of the disc brake of FIG. 1.

A first slipper 80, see FIGS. 4 and 10, similar to the slipper disclosed in U.S. Pat. No. 6,478,122, is located on the first rail 36 to receive the first ear 43 of carrier 42 and the first ear 43' of carrier 46 to reduce wear through the engagement of the ears 43, 43' with rail 36 and as second slipper 80' is located on the second rail 38 to receive the second ear 45 on carrier 42 and the second ear 45' on carrier 46 to reduce wear through the engagement of ears 45,45' with rail 38. Slipper 80 has a leg 81 that extends there from and engages the carrier 42 such that ear 45 is urged toward rail 38 while slipper 80' has a leg 81' that engages carrier 46 such that ear 43' is urged toward rail 36 while in a position of rest.

Figure 2:
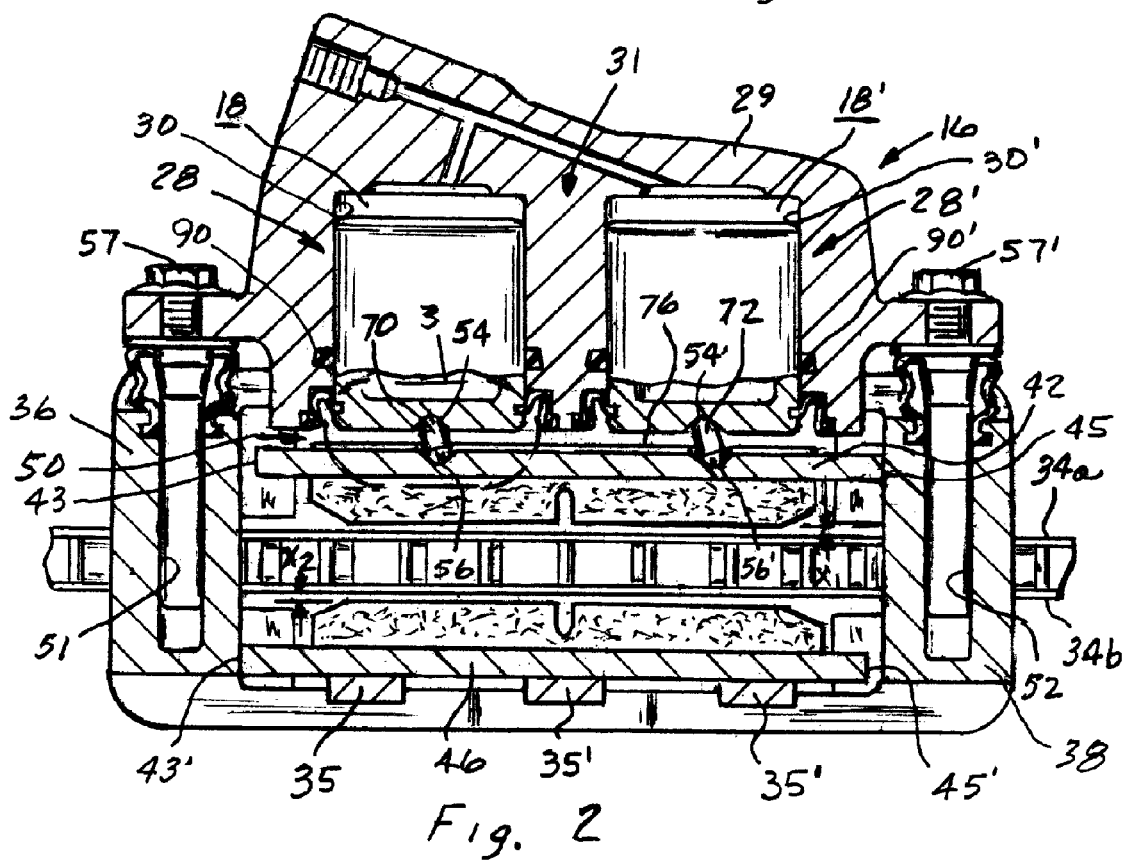
FIG. 2 is a sectional view taken along line 2-2 of o FIG. 1.

The toggle means 50 of the present invention through which an operational input force is communicated from the piston members 28,28' to the first friction member 40 is defined by a radial groove 54, as illustrated in FIG. 5, located in the face 32f of the cylindrical body 32 of each piston member 28,28', radial grooves 56,56' located between a first end 43 and a second end 45 of carrier 42 for the first friction member 40, see FIGS. 2,4 and 8, and a first oval shaped member 70, that is located between radial groove 54 and radial groove 56 and a second oval shaped member 72 that is located between radial groove 54' and radial groove 56'. The first 70 and 72 oval shaped members each have a first 71 and second 73 projections or arms, see FIG. 6 that extend from a first end 75 along a plane that is perpendicular to its major axis X. The first end 75 of oval shaped member 70 is located in groove 56 while the first end 75' of oval shaped member 72 is located in groove 56' and retained therein by a retention plate 76, see FIGS. 4 and 7. The plate 76 has slots 78,78' therein that are aligned with grooves 56,56' in carrier 42 such that the body of the first and second oval shaped members 70 and 72 pass through but projections 71,73, 71',73' engage plate 76 to keep end 75,75' in grooves 56,56'.

Mode of Assembly

The anchor 12 is fixed to a stationary member 14 on a vehicle by bolts that pass that bosses 15 in base 35 such that rail 36 and rail 38 are perpendicular to rotor 34, see FIG. 4. The first friction member 40 with the first 70 and second 72 oval shaped members retained in grooves 56, 56' of carrier 42 by retention plate 76 is positioned in anchor 12 such that ear 43 is located in rail 36 and engages leg 81 of slipper 80 to center the carrier 42 between the first rail 36 and second rail 38 while the second friction member 44 is also positioned in anchor 12 with ear 43' located in rail 36 and ear 45' located in rail 38. The caliper 16 with pistons 28,28' respectively located in bores 30,30' is aligned with the first 40 and second 44 friction members such that arms 35,35'35" engage carrier 46 and the first 70 and second 72 oval members are respectively located in grooves 54,54'. Heads 57,57' are thereafter attached to bolts 53 and 55 which have been previously located in bores 51 and 52 by passing through ears 49 and 49' to complete the assembly of the disc brake 10 illustrated in FIGS. 1 and 2.

Mode of Operation

Figure 11:
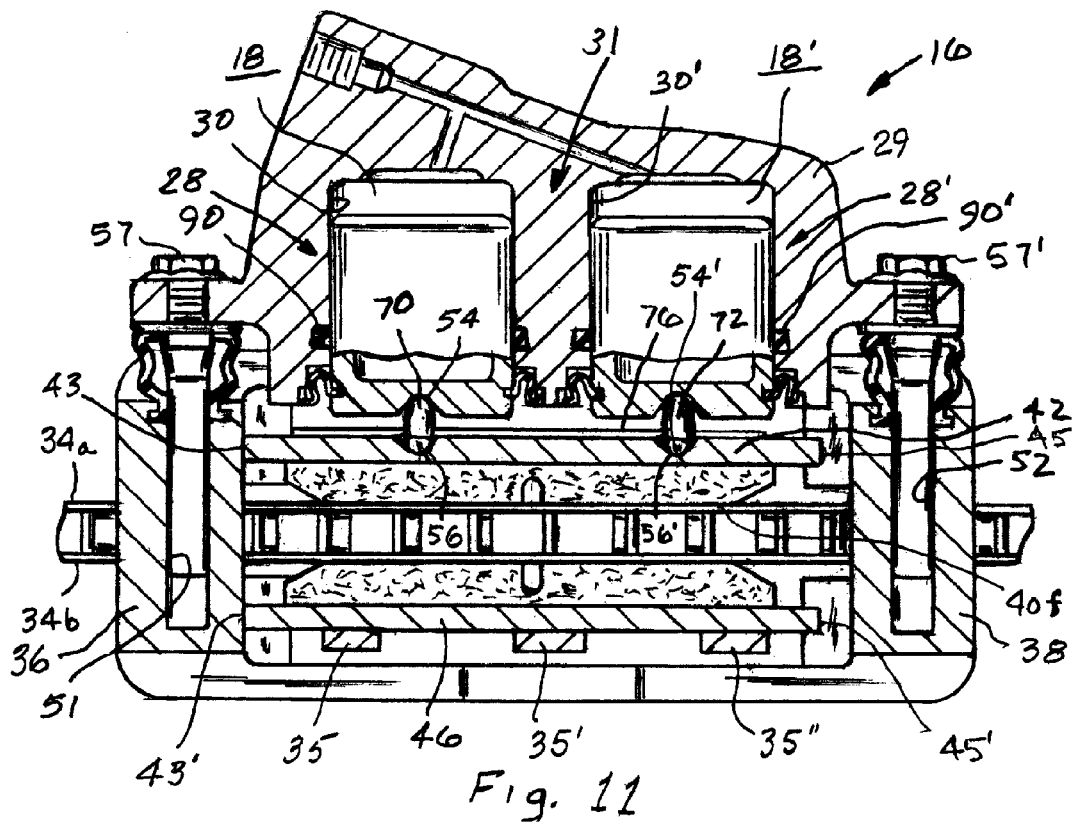
FIG. 11 is a sectional view of the disc brake of FIG. 2 during a brake application.
Figure 3:
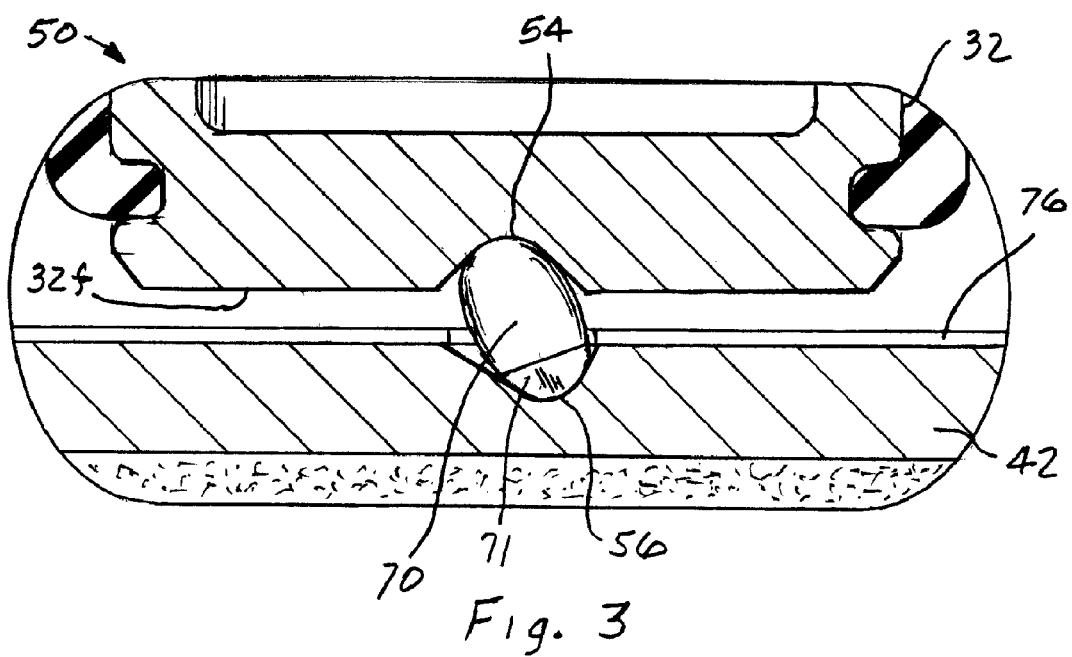
FIG. 3 is an enlarged view of the circumscribed area 3 of FIG. 2.

In a vehicle equipped with a disc brake 10, pressurized fluid is presented to actuation chambers 18, 18' that acts on pistons 28, 28' to define an actuation force for initially moving the first friction member 40 toward rotor 34 by way of the toggle means 50. The first 70 and second 72 oval members of the toggle means 50 in a position of rest are positioned in a manner as illustrated in FIG. 3 wherein the major axis thereof is located in an obtuse plane with respect to the axis of bores 30, 30' and when face 40f engages face 34a on rotor 34 a resistance force is created that causes the first friction member 40 to rotate after overcoming the centering effect of leg 81 on slipper 80 and bring end 43 into engagement with rail 36. As carrier 42 rotates toward rail 36, the oval shaped members 70 and 72 respectively pivot in grooves 56, 56' to a position illustrated in FIG. 11 and mechanically move the housing 29 away from the rotor 34 such that arms 35, 35'35" act on carrier 46 to bring face 42f on the second friction member 42 into engagement with face 43b on rotor 43 by the time that end 43' engages rail 36. Thereafter, pressurized fluid presented to chambers 18, 18' may simultaneously act on pistons 28, 28' and housing 29 to develop a clamping force across rotor 34 and effect a brake application.

On termination of a brake application, pressurized fluid is removed from chambers 18, 18' and return seals 90, 90' respectively act on cylindrical bodies 32, 32' to retract pistons 28, 28' to a position of rest within bores 30 and 30'. As pistons 28, 28' are retracted into bores 30, 30', leg 81 on slipper 80 acts on carrier 42 to move end 45 toward rail 38 and return the first 70 and second 72 oval shaped members to a position of rest as illustrated in FIG. 2 such that the oval shaped members are located in an obtuse plane with respect to the axis of bores 30, 30'. Since the first 70 and second 72 oval shaped members are not fixed to the face 32f of pistons 28, 28', a gap is initially created between the ends 76, 76' of the oval shaped members 70 and 72 which represents the clearance provided by the piston retraction. Thereafter, when rotor 34 engages face 40f on the first friction member 40 and face 44f on the second friction member 44 as a result of rotor run out ends 76,76' are moved into engagement with groove 54,54' and a first running clearance $X_1$ is created between face 40f on the first friction member 40 and rotor face 34a and a second running clearance $X_2$ is created between face 44f on the second friction member 44 and rotor face 34b as illustrated in FIG. 2 for the position of rest for the first 40 and second 44 friction members. The size of the gap between the end 76, 76' of the oval shaped members 70 and 72 and the radial grooves 54, 54' is a function of the resiliency of the seals 90, 90' and may be increased such that the running clearances $X_1$ and $X_2$ are correspondingly increased and yet mechanically closed by the rotation of carrier 42 prior to the development of a clamping force in effecting a brake application.

What is claimed is:

1. A disc brake having a support member fixed to a stationary member with first and second spaced apart rails that extend there from to receive and align a first friction member with a first side of a rotor and align a second friction member with a second side of the rotor and a caliper having a housing with an actuation chamber that receives pressurized fluid from a source that acts on a piston arrangement and the housing to create a braking force that respectively moves the first and second friction members into engagement with the first and second sides of the rotor to effect a brake application, said disc brake being characterized in that said piston arrangement includes a first cylindrical body having a face with a first radial groove therein; in that said first friction member includes a carrier having a second radial groove that is located between a first carrier end and a second carrier end; and by linkage means having a first linkage end retained in said first radial groove and a second linkage end retained in said second radial groove, said braking force from said piston arrangement being communicated through said linkage means to said carrier for moving said first friction member into engagement with the first side of said rotor such that the first carrier end is rotated into abutment engagement with said first rail to oppose the rotation of the rotor, wherein rotation of the carrier into abutment with the first rail causes said linkage means to pivot in said second radial groove an amount sufficient to cause the housing of said caliper to mechanically move said second friction member into engagement with the second side of the rotor.

2. The disc brake as recited in claim 1 wherein said piston arrangement is characterized by a first piston member defining said first cylindrical body and a second piston member defining a first cylindrical body that are respectively located in first and second bores defined within said housing of the caliper, a first seal means retained within said first bore and resiliently engaging said first cylindrical body and a second seal means retained within said second bore and resiliently engaging said second cylindrical body such that on termination of the pressurization fluid to said actuation chamber said first and second seal means return said first cylindrical body and said second cylindrical body each to a position of rest.

3. The disc brake as recited in claim 1 further including a spring supported on said first rail and positioned to urge said carrier member toward said second rail.

4. The disc brake as recited in claim 3 wherein said linkage means is rotated from an obtuse orientation with respect to said carrier to a perpendicular orientation with respect to said carrier during a brake application.

5. A disc brake having a support member fixed to a stationary member with first and second spaced apart rails that extend there from to receive and align a first friction member with a first side of a rotor and align a second friction member with a second side of the rotor and a caliper having a housing with an actuation chamber therein that selectively receives pressurized fluid from a source that acts on a piston arrangement and the housing to create a braking force that respectively moves the first and second friction members into engagement with the first and second sides of the rotor to effect a brake application, said disc brake being characterized in that said piston arrangement includes a first cylindrical body with a first face having a first radial groove therein and a second cylindrical body with a second face having a second radial groove therein; in that said first friction member includes a carrier having a third radial groove and a fourth radial groove that are located between a first carrier end and a second carrier end; and by linkage means having a first linkage member retained between said first radial groove in said first piston and said third radial groove in said carrier and a second linkage member retained between said second radial groove in said second piston and said fourth radial groove in said carrier, said braking force from said first and second cylindrical bodies being communicated through said first and second linkage members of the linkage means to said carrier for moving said first friction member such that on engagement with the first side of said rotor said carrier member is rotated and the first carrier end is brought into abutment engagement with said first rail to oppose the rotation of the rotor, wherein rotation of the carrier into abutment with the first rail causes said first and second linkage members of said linkage means to pivot in said third and fourth radial grooves an amount sufficient to cause the housing of said caliper to move said second friction member into engagement with the second side of the rotor.

6. The disc brake as recited in claim 5 wherein said first and second linkage members of said linkage means each have an oval shape member with a major axis being moved from a rest position into substantial parallel alignment with the cylindrical bodies for the communication of the brake force into the first friction member in effecting a brake application.

7. The disc brake as recited in claim 6 wherein the first and second linkage members each include first and second perpendicular arms that extend respectively therefrom, said first and second arms of the first linkage member being located in said third radial groove and said first and second arms of the second linkage member being located in said fourth groove.

8. The disc brake as recited in claim 7 further including a retention member fixed to said first carrier and engaging said first and second perpendicular arms of said first and second linkage members to hold said first and second linkage members in relation to said first carrier.

9. The disc brake as recited in claim 5 further comprising a spring located between said first rail and said first carrier end and positioned to urge said first carrier toward said second rail.

\* \* \* \* \*